(12) United States Patent
Oda et al.

(10) Patent No.: US 6,599,660 B2
(45) Date of Patent: Jul. 29, 2003

(54) BATTERY MODULE AND METHOD OF MANUFACTURING THEREOF

(75) Inventors: Takashi Oda, Kato-gun (JP); Hideki Okajima, Nishinomiya (JP); Yukichi Uesugi, Tuna-gun (JP); Hitoshi Tanaka, Mihara-gun (JP); Yoshinobu Okumura, Sumoto (JP)

(73) Assignee: Sanyo Electric Co., Ltd., Osaka (JP)

( * ) Notice: Subject to any disclaimer, the term of this patent is extended or adjusted under 35 U.S.C. 154(b) by 171 days.

(21) Appl. No.: 09/799,627

(22) Filed: Mar. 7, 2001

(65) Prior Publication Data

US 2001/0031393 A1 Oct. 18, 2001

(30) Foreign Application Priority Data

Mar. 30, 2000 (JP) ........................................ 2000-094918
Sep. 8, 2000 (JP) ........................................ 2000-273647

(51) Int. Cl.⁷ ............................................. H01M 6/42
(52) U.S. Cl. ..................... 429/158; 429/149; 429/156; 429/157
(58) Field of Search ............................. 429/149, 156, 429/157, 158

(56) References Cited

U.S. PATENT DOCUMENTS 3,923,549 A    12/1975   Mabuchi et al.
5,900,332 A  * 5/1999   Marukawa et al. ......... 429/158

FOREIGN PATENT DOCUMENTS

| JP | 54-52640   | 11/1979 |
| JP | 59-224055  | 12/1984 |
| JP | 59-224056  | 12/1984 |
| JP | 08171896   | 7/1996  |

* cited by examiner

Primary Examiner—Carol Chaney
Assistant Examiner—Dah Wei D Yuan
(74) Attorney, Agent, or Firm—Nixon & Vanderhye P.C.

(57) ABSTRACT

A battery module of the present invention comprises an annular connecting member 10 having an aperture 14 at a position corresponding to a cap 8 provided on a sealing plate 7 and between the sealing member 7 of one cell B and a bottom of a can 6 of the other cell A. The annular connecting member 10 comprises an annular base portion 11 having its outer diameter smaller than an inner diameter of the opening portion of the can 6, a convex portion 12 with bottom protruding upward or downward alternately from the annular base portion 11, and a projection 13 projecting from the bottom of the convex portion 12. Thereby, the connecting portion between the cell A and the cell B has a collecting path of a length between both projections 13, namely, a length between the sealing plate 7 of the cell B and the bottom of the can 6 of the cell A, whereby the voltage drop across the connecting portion decreases, resulting in a battery module having high operation voltage.

12 Claims, 12 Drawing Sheets

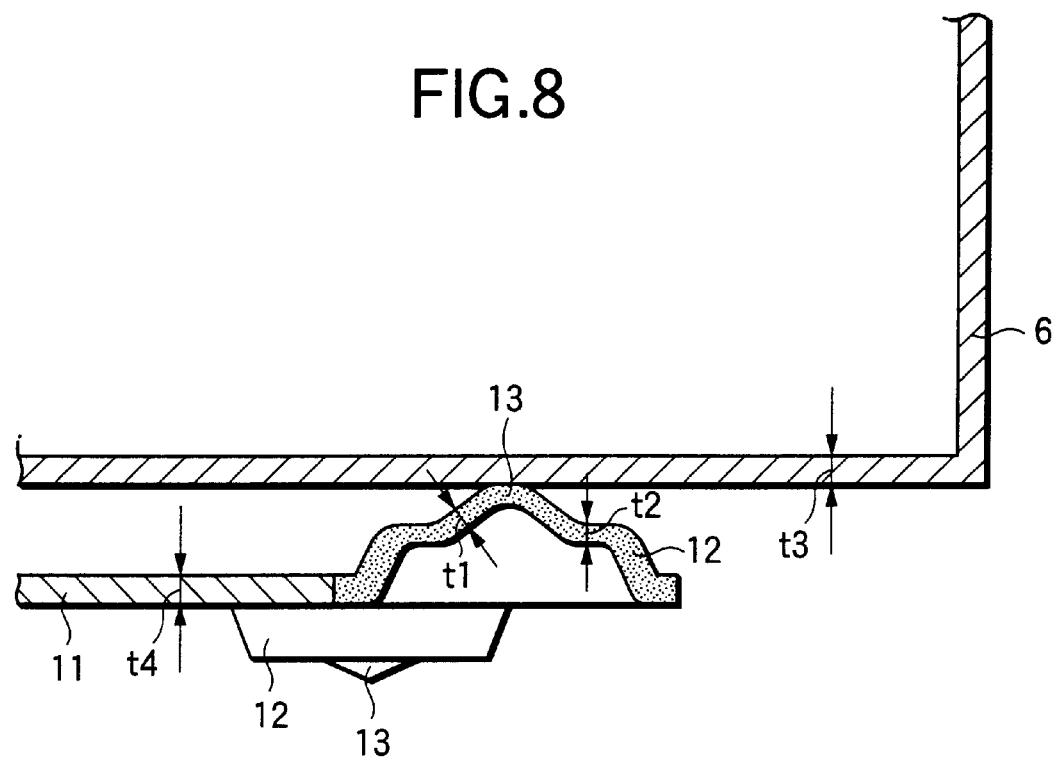
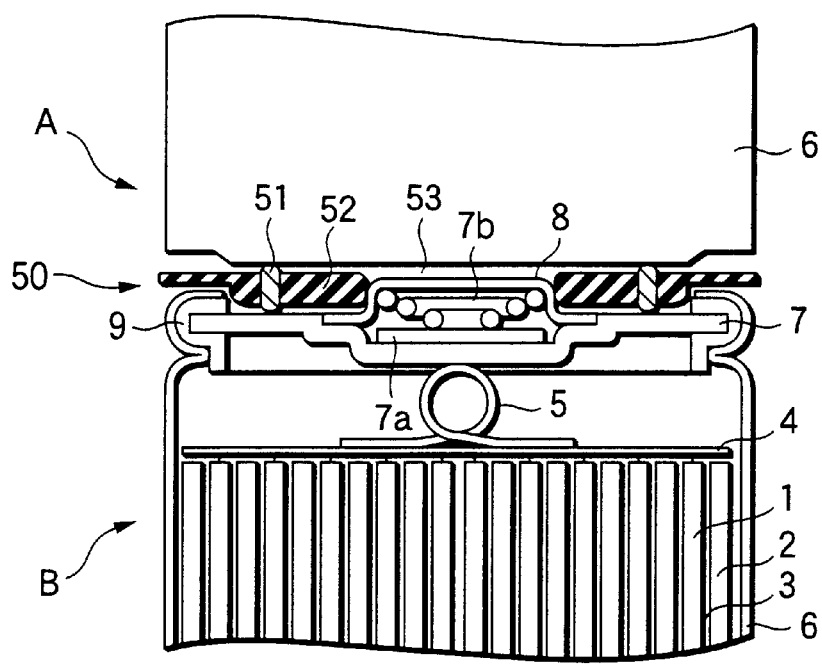

BATTERY MODULE AND METHOD OF MANUFACTURING THEREOF

BACKGROUND OF THE INVENTION

1. Field of the Invention

The present invention relates to a battery module and a method for manufacturing the battery module consisting of a plurality of cells connected by welding, each cell comprising a group of electrodes having a positive electrode and a negative electrode laminated via a separator and an electrolytic solution, which are contained and hermetically sealed within a metallic can serving as a terminal of one electrode.

2. Description of the Related Art

Generally, in the alkaline batteries such as a nickel-hydride battery or a nickel-cadmium battery, a positive electrode and a negative electrode with a separator interposed are wound like a vortex, a collector is connected to the end of the positive electrode or negative electrode to form an electrode assembly, and this electrode assembly is contained within a metallic case. Thereafter, a lead part extending from the collector is welded to a sealing member, and the sealing member is attached via an insulating gasket to an opening portion of the battery case, whereby an alkaline battery is hermetically sealed. When such alkaline battery is employed in the electric tools or electric vehicles, owing to the requirement for a high output, it is common use that a battery module is made by connecting a plurality of cells in series.

Such battery module is produced in such a way as to weld one end of a lead plate 85 to a positive electrode cap 82 provided as a positive electrode terminal on a sealing plate 81 of a cell 80*b*, and the other end of the lead plate 85 to a bottom portion 84 of a metallic can 83 of a cell 80*a*, with a central part of the lead plate 85 being bent like U character, whereby a plurality of cells 80*a*, 80*b* are connected in series, as shown in FIG. 15.

By the way, if the plurality of cells 80*a*, 80*b* connected via the lead plate 85 bent like U character are discharged, a discharge current flows through the lead plate 85. Therefore, the voltage drop increases, as the lead plate 85 is longer and thinner. This voltage drop is not so problematical when the discharge current is small, but when the battery module is employed in the uses where a large current flows such as the power tools or electric vehicles, there is the problem that the operation voltage may decrease due to the voltage drop.

Therefore, a method was conceived in which the cells were connected directly by soldering the opposite terminals of the cells without the use of the lead plate. However, there was the problem that the soldering had a weaker strength of the connected portion than the welding, and was difficult to effect the connection securely. Also, there was another problem that it was troublesome or poor in working efficiency to solder the opposite electrodes of the cells.

Thus, as a result of various experiments, the present applicants have developed an epochal method of welding directly the adjacent terminals of the cells bypassing a welding current in a direction of charging or discharging the cells. This method is one in which a plurality of cells 90*a*, 90*b* are contained within a holding barrel, not shown, and aligned in one row, then one welding electrode 96 being placed on a positive electrode cap 92 of a cell at an uppermost end thereof, and the other welding electrode 97 being placed on a bottom 94 of a metallic can 93 of a cell at a lowermost end thereof, as shown in FIG. 16.

Thereafter, a voltage is applied between the welding electrodes 96, 97 which are subjected to a pressure to conduct a large pulse current. Thereby, a contact part between the bottom 94 of the metallic can 93 of a cell 90*a* and the positive electrode cap 92 of a cell 90*b* is molten and welded.

Thereby, the adjacent terminals of the cell are directly welded together, whereby a voltage drop across this welded portion decreases, so that the battery module has an improved operation voltage.

However, if a plurality of cells are aligned in one row, a pair of welding electrodes are disposed at both ends thereof, a voltage is applied between the pair of welding electrodes which are subjected to pressure to conduct a large pulse current to weld the contact part between the bottom of the metallic can of one cell and the positive electrode cap of the other cell, as described above, an excessive pressure may be directly exerted to the positive electrode cap when the pair of welding electrodes are pressurized. In this case, there was the problem that when the excessive pressure was applied to the positive electrode cap, the positive electrode cap might be compressed or deformed.

Since a pressure valve was disposed within the positive electrode cap, there was the problem that the pressure valve might be operated abnormally if the positive electrode cap was compressed or deformed.

SUMMARY OF THE INVENTION

The present invention has been achieved to solve the above-mentioned problems, and its objective is to provide a battery module of a structure in which a number of cells are welded without damaging a cap portion containing a pressure valve and causing a welding failure.

In order to achieve the above-mentioned objective, according to the present invention, a battery module consisting of a plurality of cells electrically connected, each cell comprising a case (metallic can) serving as a terminal of one electrode and containing a cell element with a positive electrode and a negative electrode disposed to sandwich an electrolyte, and a terminal of the other electrode isolated from said metallic can, said battery module comprising: a connecting member having at least one projection on each of said terminal sides between adjacent two terminals of said cells; wherein each of contact parts between said connecting member and said terminals of said cells are welded at said projection.

Preferably, said connecting member is welded at the contact part with the bottom of said can.

Preferably, said connecting member has an aperture in an area corresponding to said terminal, and is formed to surround said aperture.

Preferably, said connecting member is welded with said can at the bottom of said can, and is configured to reach a part of a lateral face along an outside periphery of said can, and cover the part of said lateral face.

Preferably, said connecting member is configured to reach a part of a lateral face along an outside periphery of said can, and is welded with said can at the lateral face of said can.

Namely, a battery module comprises a connecting member having an aperture at a position corresponding to a cap between a sealing member of one cell and a bottom of a can of the other cell, the aperture having a larger diameter than that of the cap, wherein a contact part between this connecting member and the sealing member of the one cell, as well as a contact part between this connecting member and the bottom of the can of the other cell are connected by welding respectively.

In this way, since the contact part between this connecting member and the sealing member of the one cell, as well as the contact part between this connecting member and the bottom of the can of the other cell are connected by welding respectively, the sealing member of the one cell and the bottom of the can of the other cell are electrically connected via the connecting member, whereby the connecting portion between the sealing member of the one cell and the bottom of the can of the other cell has a collecting path of a length equivalent to the height of the connecting member, namely, the length between the sealing member of the one cell and the bottom of the can of the other cell. Therefore, the voltage drop across the connecting portion decreases, resulting in a battery module with a high operation voltage.

If the sealing member of the one cell and the bottom of the can of the other cell are electrically connected via the connecting member having the aperture having a larger diameter than the cap at the position corresponding to the cap provided on the sealing member, the cap provided on the sealing member is not welded, so that the cap is not subjected to compression and deformation, or damage. Thereby, the battery module is produced without having effect on the operation pressure of a safety vent disposed within the cap.

And the connecting member is made of a conductive material, and comprises an annular base portion having its outer diameter smaller than an inner diameter of the opening portion of the can, a convex portion with bottom protruding upward or downward alternately from the base portion, and a projection projecting from the bottom of the convex portion, whereby owing to the convex portion with bottom protruding upward or downward alternately from the base portion, the annular connecting member can afford a resiliency between the sealing member of the one cell and the bottom of the can of the other cell.

Therefore, a welded portion between the projection projecting downward (or upward) and the sealing member of the one cell, as well as a welded portion between the projection projecting upward (or downward) and the bottom of the can of the other cell have the improved welding strength, whereby the voltage drop across the welded portion further decreases, resulting in the battery module with higher operation voltage. In this case, since the outer diameter of the annular base portion is smaller than the inner diameter of the opening portion of the can, the contact between the upper end part of the can of the one cell and the bottom of the can of the other cell can be prevented, resulting in the battery module that causes no welding failure.

Also, since the annular base portion is partially formed with a notch, the connecting member can be inserted between the cells, after the cells are aligned in one row. Therefore, the aligning operation of the cells is facilitated. The shape of the base portion may be polygonal, besides being annular. Since the connecting member comprises a first base portion curved or crooked along an outside periphery of the opening portion of the can, and a second base portion curved or crooked along an outside periphery of the opening portion of the can, the first base portion and the second base portion being spaced from each other with a cap interposed to form an aperture in the central part thereof, the inserting operation of the connecting member into the cells is further facilitated.

In the case where a battery module using such connecting member failed in the welded portion due to some accident, the welded portion on the bottom of the can is broken, if the thickness of the projection is greater than that of the bottom of the can, bringing about the danger that the electrolytic solution may leak. Hence, the thickness of the projection, as well as the thickness of the convex portion, are preferably smaller than that of the bottom of the can. If the thickness of the base portion is smaller than that of the bottom of the can, the connecting member has an increased resistance value, resulting in the problem that the output characteristic of the battery module decreases. The thickness of the base portion is preferably greater than that of the bottom of the can.

Also, since the annular connecting member has an annular insulating base plate having its outer diameter smaller than an inner diameter of the opening portion of the can, and a conductive ring integrally formed, the conductive ring being formed inside the base plate and jutted out vertically from the base plate, whereby the sealing member of the one cell and the bottom of the can of the other cell are connected via the conductive ring, so that the collecting path is equal to a height of the conductive ring. Therefore, the resistive voltage drop across the connecting portion decreases, resulting in a battery module with high operation voltage.

In this case, since the outer diameter of the annular insulating base plate is smaller than the inner diameter of the opening portion of the can, and the conductive ring is formed internally, the contact between the upper end part of the can of the one cell and the bottom of the can of the other cell can be securely prevented, resulting in a battery module causing no welding failure.

Also, the annular connecting member is made of a conductive material, and comprises a cylinder and a flange portion formed integrally with the bottom of the cylinder, with an insulating ring disposed around an outside periphery of the cylinder, the flange portion being welded to the sealing member of the one cell, an upper end of the cylinder being welded to the bottom of the can of the other cell. Therefore, the collecting path has a length equal to a height of the cylinder, whereby the voltage drop across the connecting portion decreases, resulting in a battery module with high operation voltage.

In this case, since the insulating ring is disposed around the outer periphery of the cylinder, the contact between the upper end part of the can of the one cell and the bottom of the can of the other cell can be securely prevented, resulting in a battery module causing no welding failure.

Further, the annular connecting member has a cylinder formed integrally with the sealing member and concentrically with a cap portion protruding from the sealing member, with an insulating ring disposed on an outside periphery of the cylinder, in which a lower end part of the cylinder is welded to the sealing member of the one cell, and an upper end part of the cylinder is welded to the bottom of the can of the other cell. Therefore, the collecting path has a height of the cylinder, whereby the voltage drop across the connecting portion decreases, resulting in a battery module with high operation voltage.

In this case, since the insulating ring is disposed around the outer periphery of the cylinder, the contact between the upper end part of the can of the one cell and the bottom of the can of the other cell can be securely prevented, resulting in a battery module causing no welding failure.

A method for manufacturing a battery module according to the present invention includes aligning a plurality of cells in one row by placing a connecting member having an aperture having a larger diameter than a cap at a position corresponding to the cap between a sealing member of one cell and a bottom of a can of the other cell, pressurizing the plurality of cells aligned in one row from both ends thereof at a predetermined pressure, and passing a welding current between a pair of welding electrodes disposed in contact with the metallic cans of arbitrary two adjacent cells, and welding the connecting member and the sealing member of the one cell, as well as the connecting member and the bottom of the can of the other cell.

In this way, since the plurality of cells are aligned in one row by interposing the connecting member having the aperture having larger diameter than the cap at the position corresponding to the cap, these cells are pressurized from both ends at a predetermined pressure, and a welding current is passed between a pair of welding electrodes disposed in contact with the metallic cans of arbitrary two adjacent cells, whereby a welding current flows from one of the pair of welding electrode through the bottom of the can of the one cell, the connecting member, the cap of the other cell, the inside of the other cell to the other of the pair of welding electrodes, or inversely.

Thereby, a Joule's heat is produced in a contact part between the bottom of the can of the one cell and the connecting member, and a contact part between the cap of the other cell and the connecting member, causing these contact parts to be molten, and welded. As a result, the bottom of the can of the one cell and the cap of the other cell are welded together via the connecting member without using a positive electrode lead plate for the welding, whereby the voltage drop across the contact part decreases, resulting in a battery module with lower voltage drop having a number of cells connected in series.

Further the terminals of the same polarity in said adjacent cells can be connected with each other.

BRIEF DESCRIPTION OF THE DRAWINGS

FIG. 1 is a view illustrating a connecting member of an embodiment 1, wherein

FIG. 3 is a view illustrating a connecting member of an embodiment 2, wherein

FIG. 4 is a view illustrating a connecting member of an embodiment 3, wherein

FIG. 5 is a view illustrating a connecting member of an embodiment 4, wherein

FIG. 8 is a cross-sectional view showing in enlargement the essence of a welded portion between the connecting member and the can of the cell to exhibit a relation between the thickness of the connecting member of the invention and the thickness of the can of the cell.

FIG. 9 is a cross-sectional view of the cells which are connected using a connecting member of the variation 1.

DESCRIPTION OF THE PREFERRED EMBODIMENTS

Figure 1A:
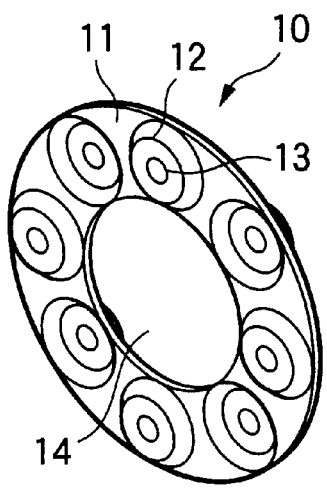
FIG. 1A is a perspective view of the connecting member.
Figure 1B:
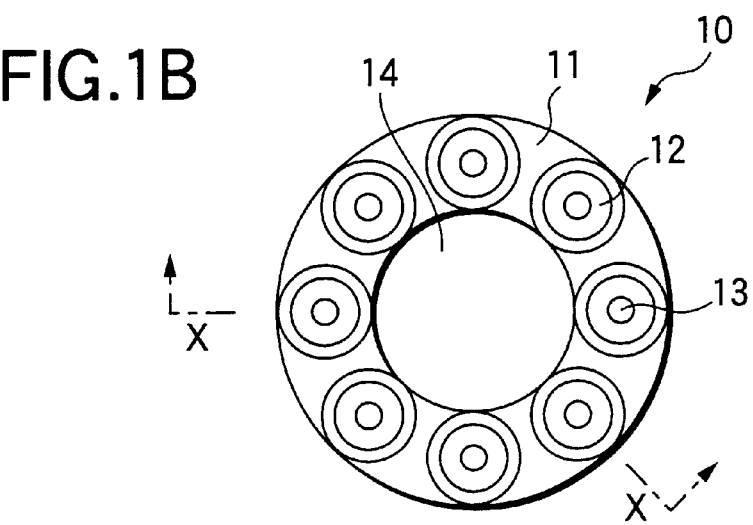
FIG. 1B is an upper view of the connecting member.
Figure 1C:
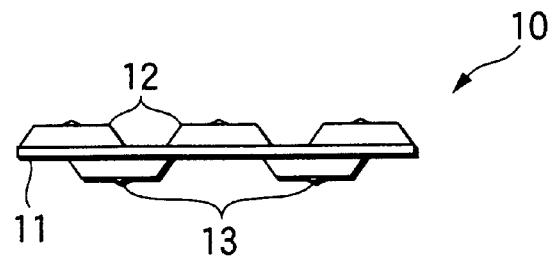
FIG. 1C is a front view of the connecting member.
Figure 2:
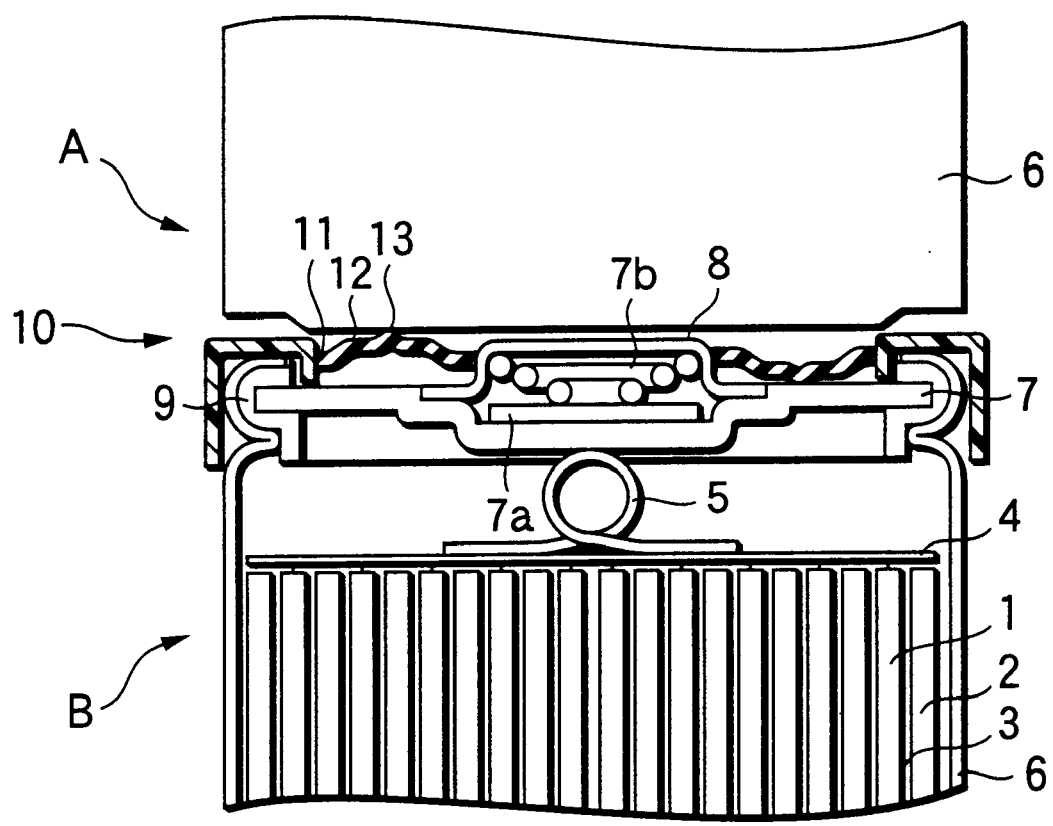
FIG. 2 is a cross-sectional view of the cells which are connected using the connecting member of the embodiment 1.
Figure 3A:
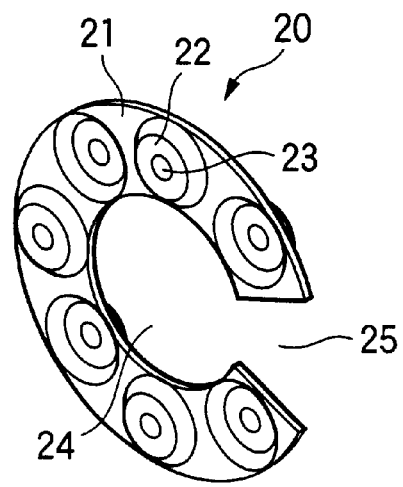
FIG. 3A is a perspective view of the connecting member.
Figure 3B:
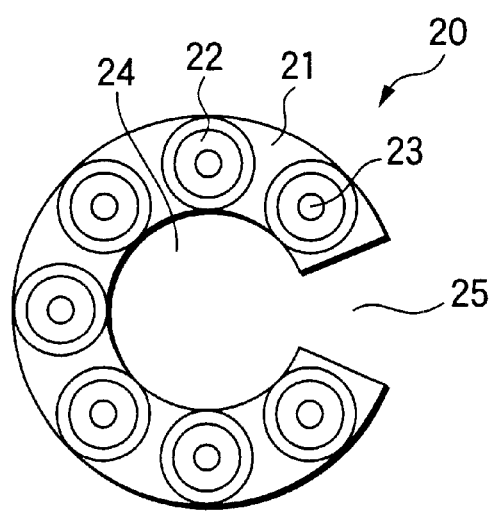
FIG. 3B is an upper view of the connecting member.
Figure 3C:
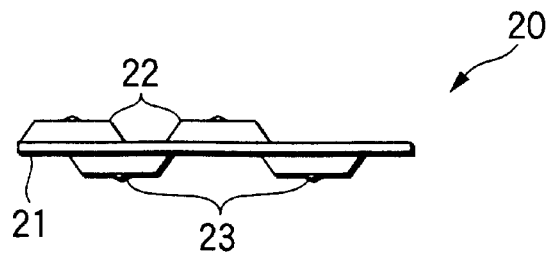
FIG. 3C is a front view of the connecting member.

A nickel-hydrogen battery according to one embodiment of the present invention will be described below with reference to FIGS. 1 to 8. FIG. 1 is a view illustrating a connecting member of an embodiment 1. FIG. 1A is a perspective view of the connecting member, FIG. 1B is an upper view of the connecting member, and FIG. 1C is a front view of the connecting member. FIG. 2 is a cross-sectional view of the cells which are connected using the connecting member of the embodiment 1. The connecting member 10 of FIG. 2 shows a cross section taken along the line x—x in FIG. 1B. FIG. 3 is a view illustrating a connecting member of an embodiment 2. FIG. 3A is a perspective view of the connecting member, FIG. 3B is an upper view of the connecting member, and FIG. 3C is a front view of the connecting member.

Figure 4A:
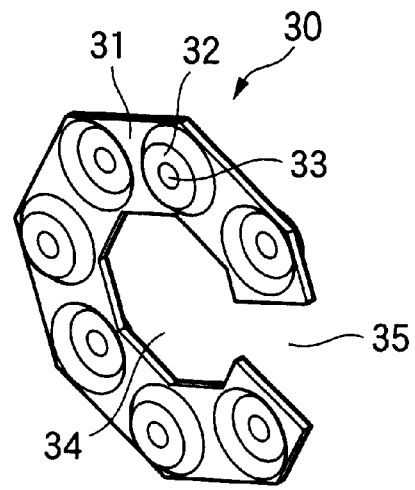
FIG. 4A is a perspective view of the connecting member.
Figure 4B:
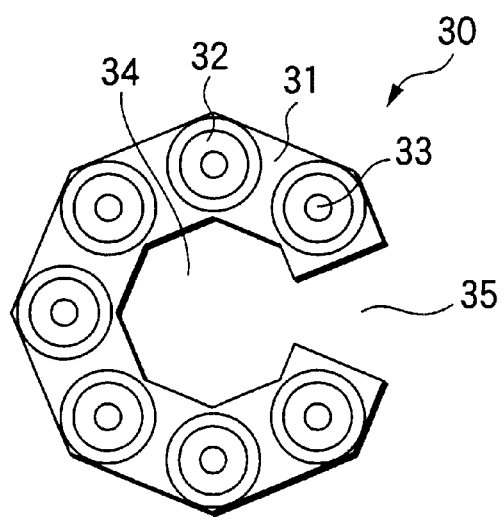
FIG. 4B is an upper view of the connecting member.
Figure 4C:
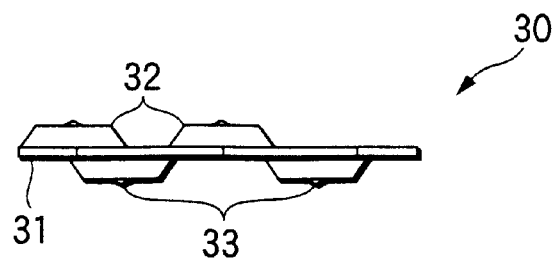
FIG. 4C is a front view of the connecting member.
Figure 5A:
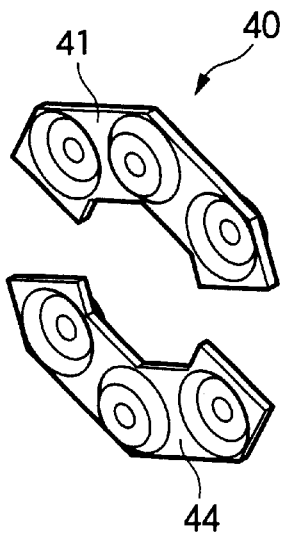
FIG. 5A is a perspective view of the connecting member.
Figure 5B:
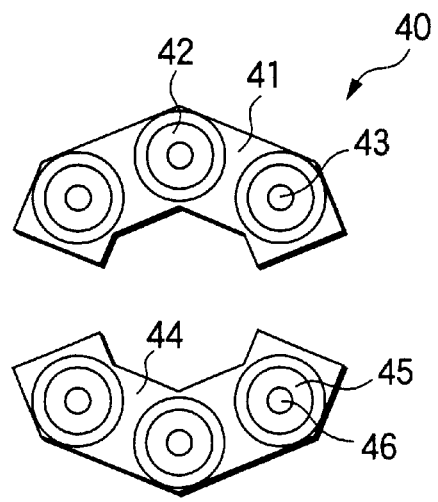
FIG. 5B is an upper view of the connecting member.
Figure 5C:
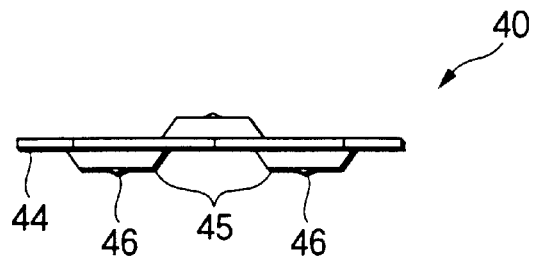
FIG. 5C is a front view of the connecting member.
Figure 6:
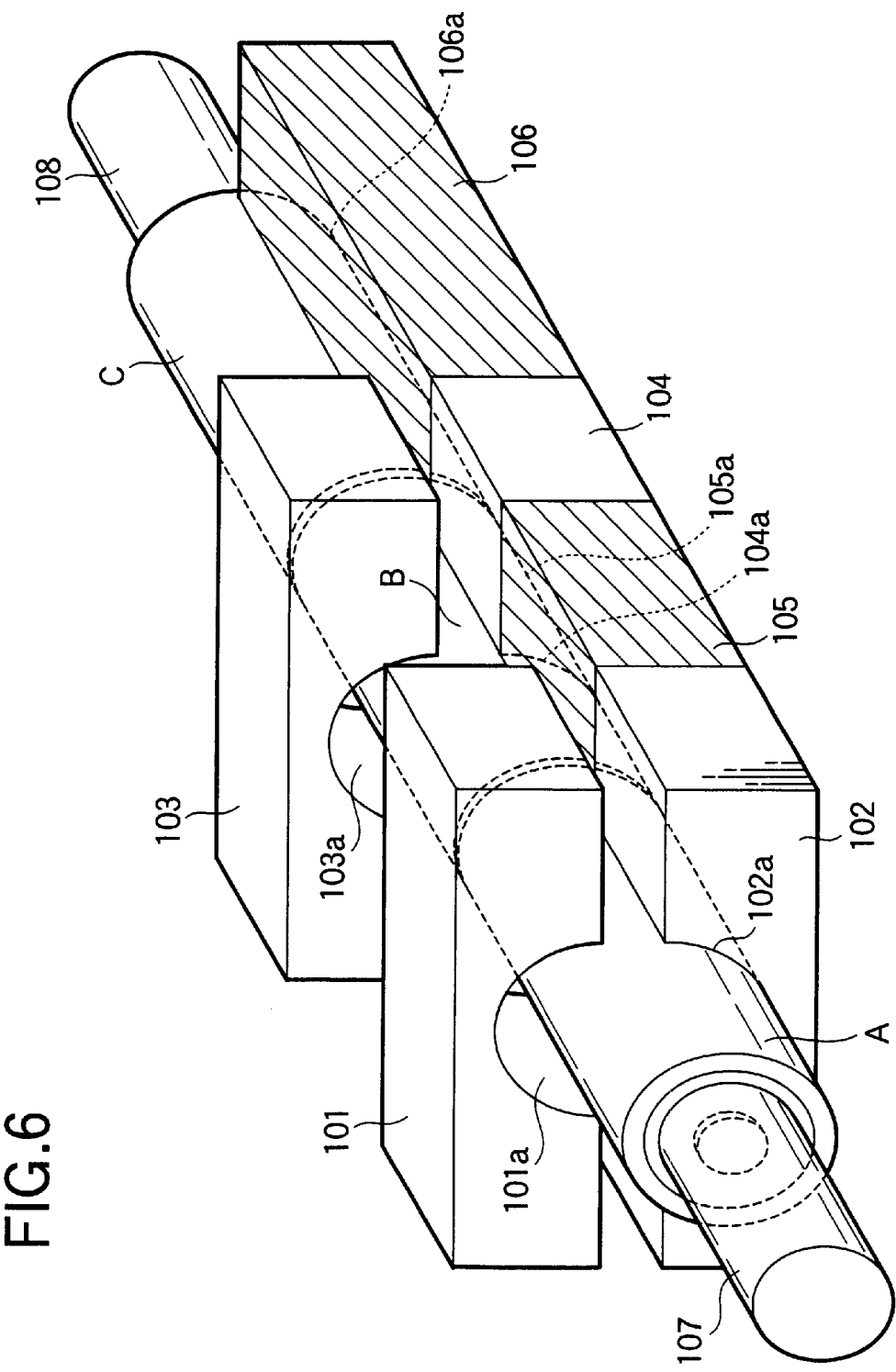
FIG. 6 is a perspective view typically showing an example of the welding equipment of the invention.
Figure 7:
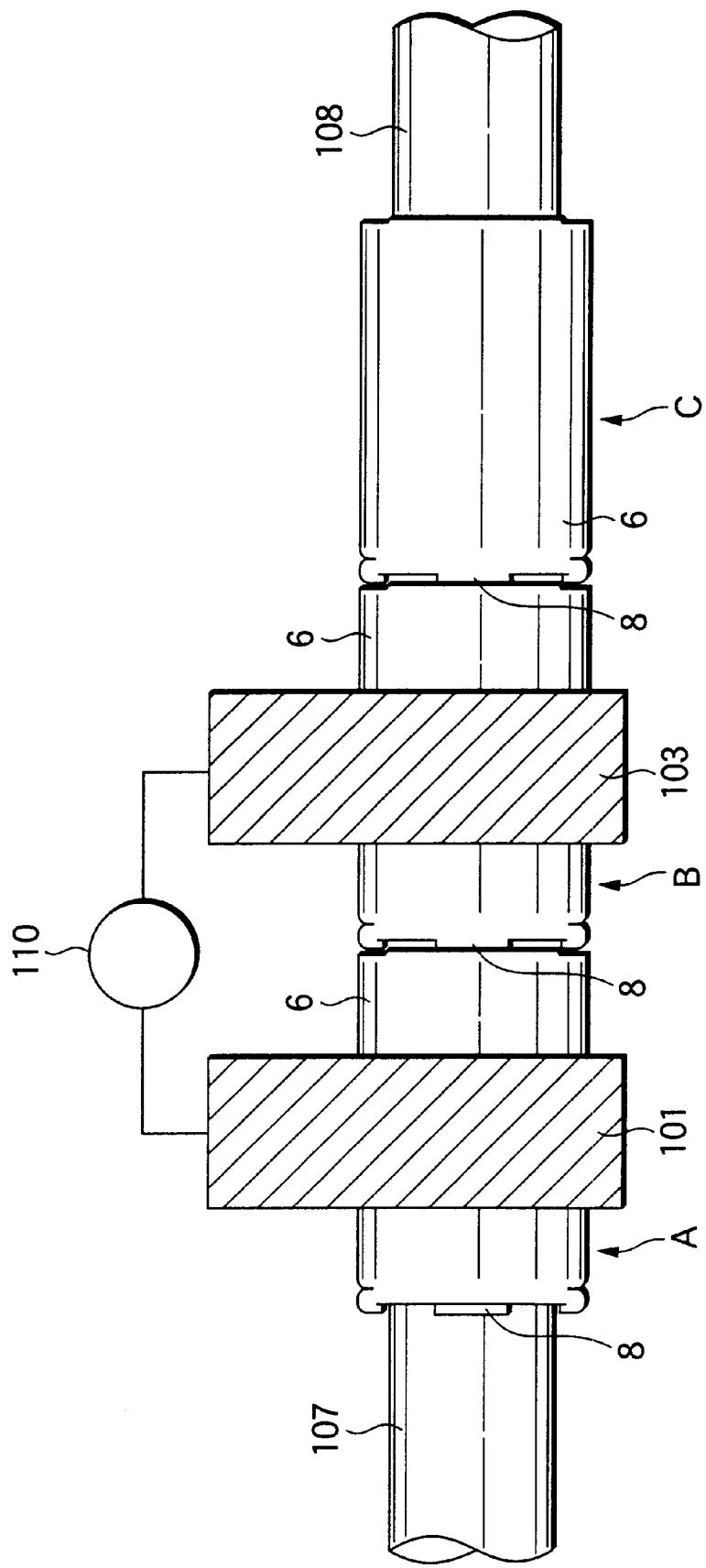
FIG. 7 is an upper view of the cells of a battery module which are welded together using the welding equipment of FIG. 6.

FIG. 4 is a view illustrating a connecting member of an embodiment 3. FIG. 4A is a perspective view of the connecting member, FIG. 4B is an upper view of the connecting member, and FIG. 4C is a front view of the connecting member. FIG. 5 is a view illustrating a connecting member of an embodiment 4. FIG. 5A is a perspective view of the connecting member, FIG. 5B is an upper view of the connecting member, and FIG. 5C is a front view of the connecting member. Further, FIG. 6 is a perspective view typically illustrating an example of the welding equipment of the invention. FIG. 7 is an upper view of the cells of a battery module which are welded together using the welding equipment of FIG. 6. Further, FIG. 8 is a cross-sectional view showing in enlargement the essence of a welded portion between the connecting member and the can of the cell to exhibit the relation in thickness between the connecting member of the invention and the can of the cell.

1. Cell Fabrication

First of all, a electrode substrate made of a panting metal has the nickel sintered porous body formed on the surface thereof, and then an active material composed principally of nickel hydroxide is filled into the nickel sintered porous body by chemical impregnation to produce a nickel positive electrode plate 1. And a negative electrode active material in paste form that is made of a hydrogen absorbing alloy is filled on the surface of the electrode substrate made of panting metal, dried, and then rolled up to a predetermined thickness to produce a hydrogen absorbing alloy negative electrode plate 2.

The nickel positive plate 1 and the hydrogen absorbing alloy negative plate 2 with a separator interposed were wound like a vortex to produce a group of electric electrodes in vortex form. Thereafter, a positive electrode collector 4 was welded to a positive electrode core exposed on an upper end face of this group of electric electrodes in vortex form, and a negative electrode collector (not shown) was welded to a negative electrode core exposed on a lower end face thereof. Then, a positive lead 5 bent to make a central part cylindrical was welded to an upper part of the positive electrode collector 4, and contained within a cylindrical can with bottom (i.e., an outside bottom face serving as an external terminal of negative electrode) 6 composed of iron plated with nickel. The negative electrode collector welded to the hydrogen absorbing alloy negative electrode plate 2 is welded to an inner bottom face of the can 6.

Then, a vibration isolating ring (not shown) is inserted into an upper inner peripheral side of the can 6, and recessing is made on an upper outer peripheral side of the can 6 to form a concave portion at an upper end of the vibration isolating ring. Then, an electrolytic solution composed of a potassium hydroxide (KOH) solution of 30 wt % is poured into the can 6. Then, it is placed on an upper part of the opening portion of this can 6 so that the bottom face of a sealing plate 7 may be contact with a cylindrical portion of the positive electrode lead 5.

Herein, a positive electrode cap (external terminal of positive electrode) 8 is provided on the upper part of the sealing plate 7, and has internally a valve body composed of a valve plate 7a and a spring 7b, with a vent hole being formed in the central part of the sealing member 7, in which the sealing member is formed of the sealing plate 7 and the positive electrode cap 8.

Then, an insulating gasket 9 is fitted around a peripheral edge of the sealing member 7, and the sealing member 7 is pressed using a press machine, and pushed into the can 6 until the lower end of the insulating gasket 9 reaches a position of the concave portion provided on an upper outside periphery of the can 6. Thereafter, the edge of the opening of the can 6 is caulked inward to seal the cell, thereby producing the nickel-hydrogen cells A, B and C.

2. Connecting Member Between Cells (1) Embodiment 1

A connecting member 10 between the cells in an embodiment 1 is formed by press shaping a metal plate having excellent conductivity such as iron, copper, nickel or alloy thereof, and has centrally a circular aperture 14 having a larger diameter than the outer diameter of a positive electrode cap 8, and an annular base plate 11 having an outer diameter smaller than the inner diameter of the opening portion of a can 6, convex portions with bottom 12, 12, . . . protruding alternately upward or downward from the annular base plate 11, as well as projections 13 projecting from the bottom of the convex portions 12, as shown in FIGS. 1 and 2. The length from a tip of the projection 13 of the convex portion 12 projecting upward from the base plate 11 to a tip of the projection 13 of the convex portion 12 projecting downward from the base plate 11 is slightly longer than the length between the bottom of the can of a cell A and the upper face of the sealing member 7 of a cell B.

(2) Embodiment 2

A connecting member 20 between the cells in an embodiment 2 is formed by press shaping a metal plate having excellent conductivity such as iron, copper, nickel or alloy thereof, and has centrally a circular aperture 24 having a larger diameter than the outer diameter of a positive electrode cap 8, and an annular base plate 21 having an outer diameter smaller than the inner diameter of the opening portion of a can 6, and partially formed with a notch 25, convex portions with bottom 22, 22, . . . protruding alternately upward or downward from the annular base plate 21, as well as projections 23 projecting from the bottom of the convex portions 22, as shown in FIG. 3.

The width of the notch 25 formed in the base plate 21 is slightly larger than the diameter of the positive electrode cap 8. Therefore, after the cells A, B and C are aligned in one row, the connecting member 20 can be inserted between the cells A and B, and between the cells B and C, whereby the aligning operation of the cells can be facilitated. The length from a tip of the projection 23 of the convex portion 22 projecting upward from the base plate 21 to a tip of the projection 23 of the convex portion 22 projecting downward from the base plate 21 is slightly longer than the length between the bottom of the can of a cell A and the upper face of the sealing member 7 of a cell B.

(3) Embodiment 3

A connecting member 30 between the cells in an embodiment 3 is formed by press shaping a metal plate having excellent conductivity such as iron, copper, nickel or alloy thereof, and has centrally a polygonal aperture 34 having a larger diameter than the outer diameter of a positive electrode cap 8, and a polygonal base plate 31 having an outer diameter smaller than the inner diameter of the opening portion of an can 6, convex portions with bottom 32, 32, . . . protruding alternately upward or downward from the polygonal base plate 31, as well as projections 33 projecting from the bottom of the convex portions 32, as shown in FIG. 4.

The width of the notch 35 formed in the base plate 31 is slightly larger than the diameter of the positive electrode cap 8. Therefore, after the cells A, B and C are aligned in one row, the connecting member 30 can be inserted between the cells A and B, and between the cells B and C, whereby the aligning operation of the cells can be facilitated. The length from a tip of the projection 33 of the convex portion 32 projecting upward from the base plate 31 to a tip of the projection 33 of the convex portion 32 projecting downward from the base plate 31 is slightly longer than the length between the bottom of the can of a cell A and the upper face of the sealing member 7 of a cell B.

(4) Embodiment 4

A connecting member 40 between the cells in an embodiment 4 is formed by press shaping a metal plate having excellent conductivity such as iron, copper, nickel or alloy thereof, and comprises a first base plate 41 crooked along an outside periphery of the opening portion of the can, and a second base plate 44 crooked along an outside periphery of the opening portion of the can. The first base plate 41 and the second base plate 44 are spaced from each other so that they can be disposed within the opening portion of the can 6, with the positive electrode cap 8 placed in the central part thereof.

The first base plate 41 has convex portions with bottom 42, 42, . . . protruding alternately upward or downward from the first base plate 41, and projections 43 projecting from the bottom of the convex portions 42. The second base plate 44 has convex portions with bottom 45, 45, . . . protruding alternately upward or downward from the second base plate 44, and projections 46 projecting from the bottom of the convex portions 45.

Since the connecting member comprises the first base plate 41 crooked along an outside periphery of the opening portion of the can, and the second base plate 44 crooked along an outside periphery of the opening portion of the can, the first base plate 41 and the second base plate 44 being spaced from each other with the positive electrode cap 8 interposed to form an aperture in the central part, the inserting operation of the first base plate 41 and the second base plate 44 between the cells A, B, C can be further facilitated.

The length from a tip of the projection 43 (46) of the convex portion 42 (45) projecting upward from the first base plate 41 (second base plate 44) to a tip of the projection 43 (46) of the convex portion 42 (45) projecting downward from the first base plate 41 (second base plate 44) is slightly longer than the length between the bottom of the can of a cell A and the upper face of the sealing member 7 of a cell B.

Moreover, the first base plate 41 and the second base plate 44 may be curved smoothly along an outside periphery of the opening portion of the can 6, instead of being crooked along the outside periphery of the opening portion of the can.

3. Welding Equipment

The welding equipment for use to manufacture a battery module of the present invention comprises a pair of welding electrodes composed of the upper and lower welding electrodes of one polarity having an upper welding electrode 101 and a lower welding electrode 102, and the upper and lower welding electrodes of the other polarity having an upper welding electrode 103 and a lower welding electrode 104, an insulating tray 105 composed of an insulator disposed between the lower welding electrodes 102, 104, an insulating tray 106 composed of an insulator disposed outside the lower welding electrode 104, a pair of pressure members 107, 108 for pressurizing both ends of cells A, B and C aligned in one row and connected in series to make a battery module, and a welding power source 110 (FIG. 7) for supplying a welding current to a pair of upper welding electrodes 101, 103 or a pair of lower welding electrodes 102, 104, as shown in FIGS. 6 and 7.

One pair of lower welding electrodes 102, 104 are formed of a metal material having excellent conductivity such as copper and shaped like a square pillar. In the central part of the surface of lower welding electrode 102, 104, a groove 102*a*, 104*a* is formed coincident with an outer shape of the lower half of each cell A, B and C. Also, one pair of upper welding electrodes 101, 103, like the one pair of lower welding electrodes 102, 104, are formed of a metal material having excellent conductivity such as copper and shaped like a square pillar. In the central part of the surface of upper welding electrode 101, 103, a groove 111*a*, 103*a* is formed coincident with an outer shape of the upper half of each cell A, B and C.

And the upper welding electrodes 101, 103 are placed on the lower welding electrodes 102, 104, respectively, whereby each of a space portion formed by the groove portions 102*a* and 101*a* and a space portion formed by the groove portions 104*a* and 103*a* has a shape coincident with an outer shape of the cells A, B and C. Thereby, a cell A (B, C) is placed on a groove portion 102*a* of a lower welding electrode 102, and an upper welding electrode 101 is laid thereon, so that the cell A (B, C) is secured. And a cell B (A, C) is placed on a groove portion 104*a* of a lower welding electrode 104, and an upper welding electrode 103 is laid thereon, so that the cell B (A, C) is secured.

The insulating tray 105, 106 is formed of an insulating material such as synthetic resin or ceramic and shaped like a square pillar. In the central part of the surface of insulating tray, a groove portion 105*a*, 106*a* having a shape coincident with an outer shape of the lower half of each cell A, B and C is formed along a direction of aligning the cells. In an example as shown in FIGS. 6 and 7, a battery module is made using three cells A, B and C, which are placed on the insulating trays 105, 106. However, in the case where a battery module is composed of a number of cells to be connected, other insulating trays than the insulating trays 105, 106 may be employed.

The pressure member 107, 108 is made of a material having a predetermined strength such as metal, synthetic resin or ceramic. After the cells A, B, C are aligned in one row on the lower welding electrodes 102, 104 and the insulating trays 105, 106, the pressure member 107 is pressed onto the positive electrode cap 8 of the cell A, and the pressure member 108 is pressed onto the bottom of the can 6 of the cell C, so that the cells A, B and C are pressurized. At least one of the pressure members 107, 108 is pressurized by pressure means such as a coil spring or an air cylinder.

The welding power source 110 is a DC power source for supplying a predetermined DC voltage to the battery module to pass a pulse DC current of 3 KA for about 15 msec between one pair of welding electrodes (in this case between the upper welding electrode 101 and the upper welding electrode 103).

A process example of manufacturing a battery module using the welding equipment as described above will be described below.

First of all, the lower welding electrode 102, the insulating tray 105, the lower welding electrode 104 and the insulating tray 106 are aligned in one row. Thereafter, a cell A is laid on the groove portion 102*a* of the lower welding electrode 102, a cell B is laid on the groove portion 105*a* of the insulating tray 105 and the groove portion 104*a* of the lower welding electrode 104, and a cell C is laid on the groove portion 106*a* of the insulating tray 106. At this time, any one of the connecting members 10, 20, 30, 40 is disposed between the cells A and B, and between the cells B and C.

Then, the upper welding electrode 101 is laid on the lower welding electrode 102 so that the groove portion 101*a* of the upper welding electrode 101 may conform with the outer shape of the cell A, and the upper welding electrode 103 is laid on the lower welding electrode 104 so that the groove portion 103*a* of the upper welding electrode 103 may conform with the outer shape of the cell B, whereby the cells A and B are secured together.

Then, the pressure member 107 is pressed onto the sealing plate 7 of the cell A, and the pressure member 108 is pressed onto the bottom of the can 6 of the cell C. Thereby, at least one of the pressure members 107, 108 is pressurized by pressure means such as a coil spring or an air cylinder, so that each cell A, B, C is pressed at a predetermined pressure (e.g., a pressure of about $1 \times 10^5 \text{N/m}^2$ to $5 \times 10^5 \text{N/m}^2$). One terminal of a connecting cord extending from the welding power source 110 is connected to the upper welding electrode 101, the other terminal being connected to the upper welding electrode 103.

If the welding power source 110 is turned on, a DC voltage with a predetermined voltage value is applied between the upper welding electrode 101 and the upper welding electrode 103, so that a DC pulse current of 3 KA is passed for about 15 msec in a direction (or an inverse direction) from the upper welding electrode 101, to the can 6 of the cell A, to the contact part between the bottom of the cell A and the connecting portion 10 (20, 30, 40), to the contact part between the connecting portion 10 (20, 30, 40) and the sealing plate 7 of the cell B, to the inside of the cell B, to the can 6 of the cell B, to the upper welding electrode 103.

Thereby, a Joule's heat is produced in the contact part between the bottom of the cell A and the connecting member 10 (20, 30, 40), and the contact part between the connecting member 10 (20, 30, 40) and the sealing plate 7 of the cell B, causing the contact parts to be molten, and welded together.

Then, the insulating tray 106, the lower welding electrode 102, the insulating tray 105, and the lower welding electrode 104 are realigned in one row. Thereafter, the welded cells A and B are laid on the groove portion 106a of the insulating tray 106 and the groove portion 102a of the lower welding electrode 102, and a cell C is laid on the groove portion 104a of the lower welding electrode 104 and the groove portion 105a of the insulating tray 105. Thereafter, the upper welding electrodes 101, 103 are laid on the lower welding electrodes 102, 104, respectively, and pressed by the pressure members 107 and 108. Then, the welding power source 110 is turned on. Thereby, a contact part between the bottom of the cell B and the connecting member 10 (20, 30, 40), and a contact part between the connecting member 10 (20, 30, 40) and the sealing plate 7 of the cell C are welded, resulting in a battery module having three cells connected in series.

In the case where the contact part between the bottom of the cell A and the connecting members 10, 20, 30, 40, and the contact part between the connecting members 10, 20, 30, 40, and the sealing plate 7 of the cell B (or C) are welded, respectively, the connecting member 10 is welded with the contact part between the projection 13 of the convex portion 12 projecting upward and the bottom of the can 6 of the cell A (B), and the contact part between the projection 13 of the convex portion 12 projecting downward and the sealing plate 7 of the cell B (C). Also, the connecting member 20 is welded with the contact part between the projection 23 of the convex portion 22 projecting upward and the bottom of the can 6 of the cell A (B), and the contact part between the projection 23 of the convex portion 22 projecting downward and the sealing plate 7 of the cell B (C).

Also, the connecting member 30 is welded with the contact part between the projection 33 of the convex portion 32 projecting upward and the bottom of the can 6 of the cell A (B), and the contact part between the projection 33 of the convex portion 32 projecting downward and the sealing plate 7 of the cell B (C). Further, the connecting member 40 is welded with the contact part between the projection 43 (46) of the convex portion 42 (45) projecting upward and the bottom of the can 6 of the cell A (B), and the contact part between the projection 43 (46) of the convex portion 42 (45) projecting downward and the sealing plate 7 of the cell B (C).

4. Review of the Thickness of Connecting Member

In the case where a battery module using such connecting member 10, 20, 30 or 40 of the above-described embodiment failed in the welded portion due to some accident, the welded portion on the bottom of the can is broken, if the thickness of the projection 13, 23, 33, 43 (46) is greater than that of the bottom of the can 6 of the cell A, B or C, bringing about the danger that the electrolytic solution may leak. If the thickness of the base portion 11, 21, 31, 41 (45) is smaller than that of the bottom of the can 6, the connecting member 10, 20, 30, 40 has an increased resistance value, resulting in the problem that the output characteristic of the battery module decreases.

In the present invention, the thickness $t1$ of the projection 13 formed on the convex portion 12 of the connecting member 10 is smaller than the thickness $t2$ of the bottom of the convex portion 12 ($t1 \leq t2$), and the thickness $t1$ of the projection 13 and the thickness $t2$ of the bottom of the convex portion 12 are smaller than the thickness $t3$ of the bottom of the can 6 ($t1 \leq t2 \leq t3$), as shown in FIG. 8 (though a connecting member 10 is only shown in FIG. 8, other connection members 20, 30, 40 can similarly apply). Also, the thickness $t4$ of the base portion 11 is greater than the thickness $t3$ of the bottom of the can 6 ($t4 \leq t3$), namely, a relation of $t1 \leq t2 \leq t3 \leq t4$ is satisfied. Thereby, the resistance value of the connecting member 10 (20, 30, 40) can be suppressed to a low value, resulting in a battery module not causing the cells to be damaged.

5. Variations of Connecting Member

Figure 10:
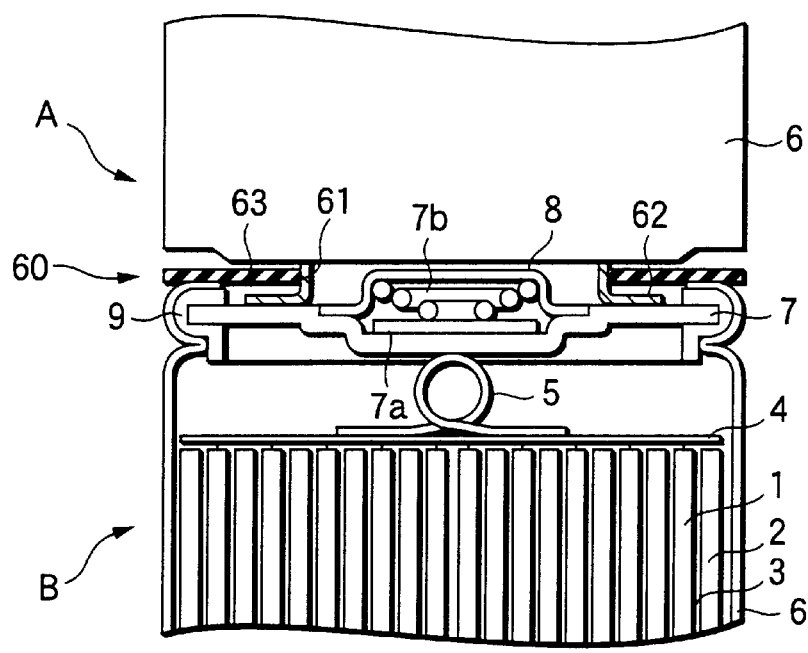
FIG. 10 is a cross-sectional view of the cells which are connected using a connecting member of the variation 2.
Figure 11:
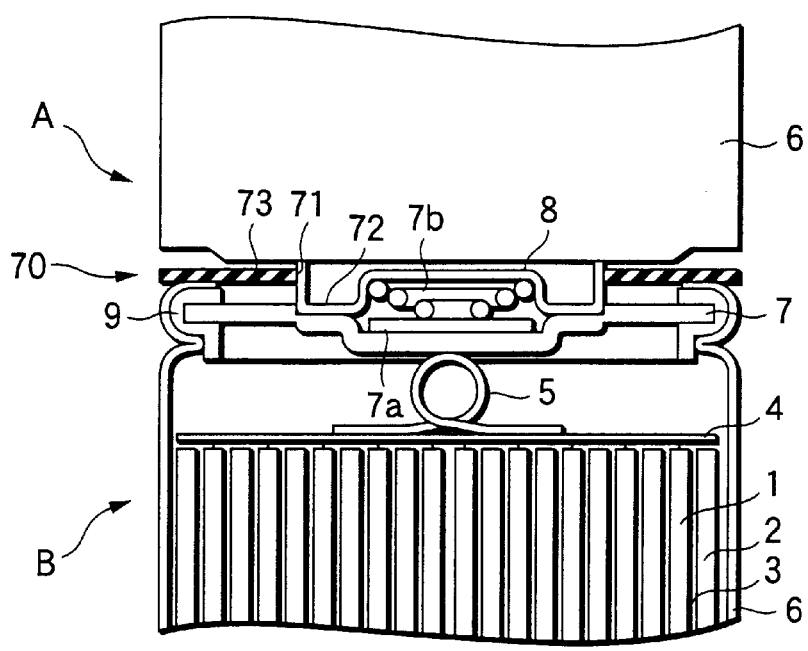
FIG. 11 is a cross-sectional view of the cells which are connected using a connecting member of the variation 3.
Figure 12A:
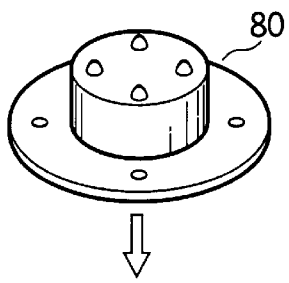
FIGS. 12A–D are views of a connecting member of the variation 4.

The connecting member between the cells for use with the invention is not limited to the above-cited embodiments, but may be made in various variations. Referring to FIGS. 9 to 11, the variations of the connecting member will be described below. FIG. 9 is a cross-sectional view of the cells which are connected using a connecting member of a variation 1. FIG. 10 is a cross-sectional view of the cells which are connected using a connecting member of a variation 2. FIG. 11 is a cross-sectional view of the cells which are connected using a connecting member of a variation 3.

(1) Variation 1

A connecting member 50 between the cells in a variation 1 comprises a conductive ring 51 made of a metal having excellent conductivity such as iron, copper, nickel or alloy thereof, and an annular insulating base plate 52 made of an insulating material such as synthetic resin or ceramic, and having an aperture 53 having a larger diameter than the outer diameter of a positive electrode cap 8 in the central part thereof, as shown in FIG. 9. The conductive ring 51 is integrally molded to jut out partially upward and downward from the annular insulating base plate 52, the remaining portion being buried within the insulating base plate 52. The annular insulating base plate 52 is formed to have a smaller outer diameter than the inner diameter of the opening portion of the can 6. The conductive ring 51 is formed to be higher than the positive electrode cap 8, and slightly greater than the length between the bottom of the can of a cell A and the upper face of the sealing member 7 of a cell B.

(2) Variation 2

A connecting member 60 between the cells in a variation 2 is produced by pressing a metal plate having excellent conductivity such as iron, copper, nickel or alloy thereof, and comprises a cylinder 61 with a flange portion 62, such that the inner diameter of the cylinder 61 is greater than the outside diameter of the positive electrode cap 8, shown in FIG. 10. And the cylinder 61 has an insulating ring 63 around its outside periphery. The height of the cylinder 61 is greater than that of the positive electrode cap 8, and slightly longer than the length between the bottom of the can of a cell A and the upper face of the sealing member 7 of a cell B.

(3) Variation 3

A connecting member 70 between the cells in a variation 3 is formed integrally with the positive electrode cap 8 by pressing a metal plate having excellent conductivity such as iron, copper, nickel or alloy thereof, and comprises a cylinder 71 formed concentrically with the positive electrode cap 8, and having a flange portion 72 on the bottom of the positive electrode cap 8, shown in FIG. 11. And the cylinder 71 has an insulating ring 73 around its outside periphery. The height of the cylinder 71 is greater than that of the positive electrode cap 8, and slightly longer than the length between the bottom of the can of a cell A and the upper face of the sealing member 7 of a cell B.

(4) Variation 4

A connecting member 80 between the cells in a variation 4 is made of a cap formed integrally by pressing a metal plate having excellent conductivity such as iron, copper, nickel or alloy thereof shown in FIGS. 12A–D. This connecting member 80 can be formed easily by pressing a metal plate. And projections are made of bars formed during the step of pressing.

(5) Variation 5

Figure 13A:
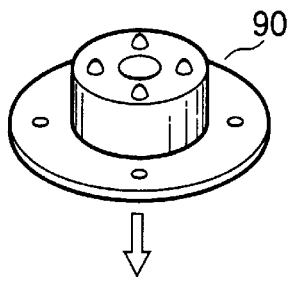
FIGS. 13A and B are views of a connecting member of the variation 5.
Figure 13B:
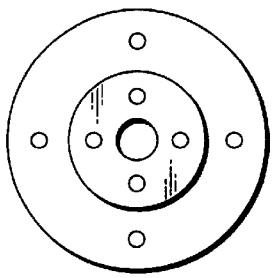

A connecting member 90 between the cells in a variation 4 is made of a cap having a hole and formed integrally by pressing a metal plate having excellent conductivity such as iron, copper, nickel or alloy thereof shown in FIGS. 13A–B. This connecting member 90 can be formed easily by pressing a metal plate. And projections are made of bars formed during the step of pressing.

(6) Variation 6

Figure 14A:
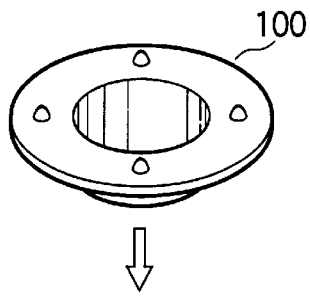
FIGS. 14A and B are views of a connecting member of the variation 6.
Figure 12B:
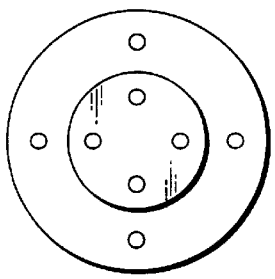
Figure 14B:
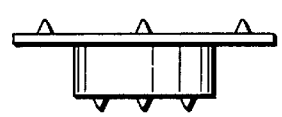
Figure 12C:
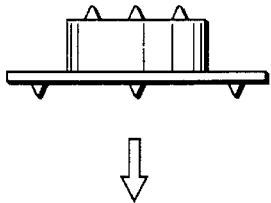
Figure 12D:
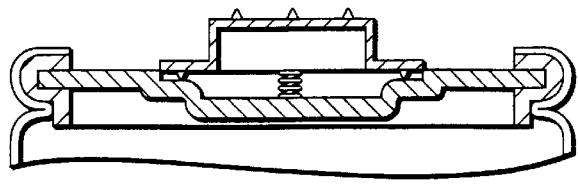
Figure 15:
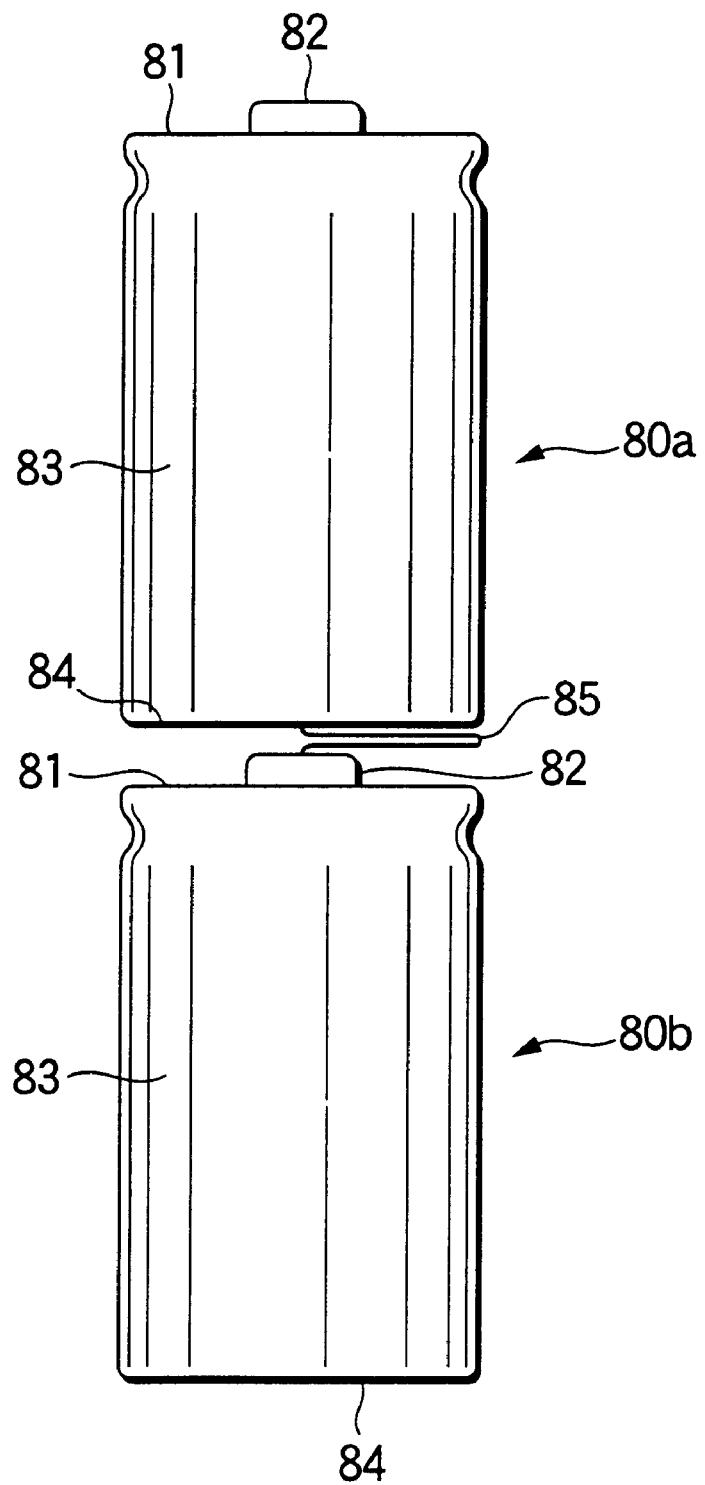
FIG. 15 is a front view showing an example of the conventional battery module.
Figure 16:
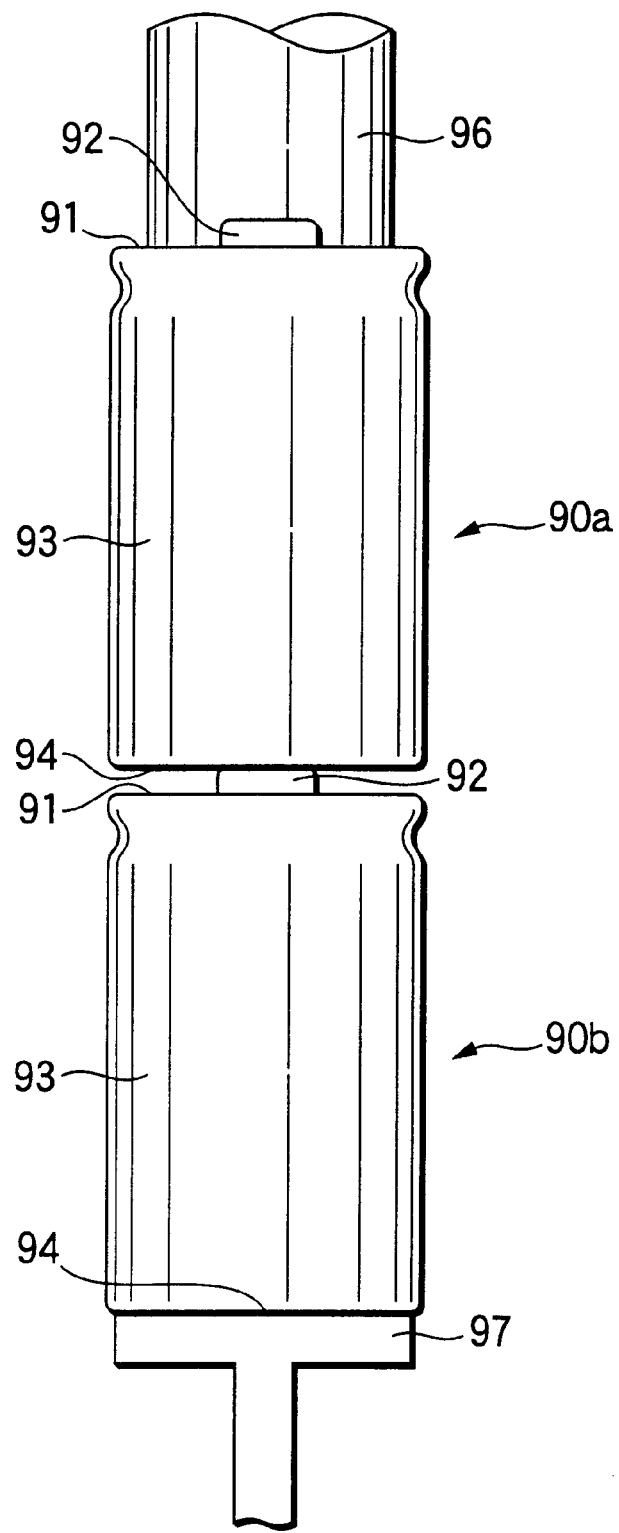
FIG. 16 is a front view showing another example of the conventional battery module.

A connecting member 100 between the cells in a variation 6 is made of a cap having a hole and formed integrally by pressing a metal plate having excellent conductivity such as iron, copper, nickel or alloy thereof shown in FIGS. 14A–B. This connecting member 100 is used in upside down state of the connecting member 80 of the variation 4.

The cells are welded together with the connecting member 50, 60 or 70 of the above variations interposed between the cells, using the welding equipment. In this case, the connecting member 50 is welded with a contact part between the upper end part of the conductive ring 51 and the bottom of the can 6 of the cell A (B), and a contact part between the lower end part of the conductive ring 51 and the sealing plate 7 of the cell B (C). Also, the connecting member 60 is welded with a contact part between the upper end part of the cylinder 61 and the bottom of the can 6 of the cell A (B), and a contact part between the flange portion 62 and the sealing plate 7 of the cell B (C).

Further, the connecting member 70 is welded with a contact part between the upper end part of the cylinder 71 and the bottom of the can 6 of the cell A (B). Since the flange portion 72 of the connecting member 70 is formed integrally with the positive electrode cap 8, this flange portion 72 is connected in advance with the sealing plate 7 of the cell A, B, C.

As described above, in this invention, since the cells are welded together with the connecting member 10, 20, 30, 40, 50, 60, or 70 interposed between them, the connecting portion between the cells has a collecting path of a length equivalent to the height of the connecting member 10, 20, 30, 40, 50, 60 or 70, whereby the voltage drop across the connecting portion decreases, resulting in a battery module with high operation voltage.

After a pair of upper and lower welding electrodes 101, 102 or 103, 104 are placed in contact with the metallic cans 6, 6 of adjacent cells, for example, a cell A and a cell B, among a plurality of cells aligned in one row, a welding current is passed between the pair of upper welding electrodes 101, 103, while the cells A, B, C in one row are pressurized from both ends at a predetermined pressure by the pressure means 107, 108. As a result, the welding current flows from the upper welding electrode 101, through the contact part between the bottom of the can 6 of the cell A (B) and the connecting member 10 (20, 30, 40, 50, 60, 70), the contact part between the connecting member 10 (20, 30, 40, 50, 60, 70) and the sealing plate 7 of the cell B (C), and the inside of the cell B (C), to the upper welding electrode 103, or inversely.

Thereby, a Joule's heat is produced in the contact part between the bottom of the cell A (or B), the connecting member 10, 20, 30, 40, 50, 60 or 70 and the sealing plate 7 of the cell B (or C), causing the contact part to be molten and welded. The voltage drop across the welded portion decreases without the use of the lead plate for welding, resulting in a battery module having low voltage drop in which a number of cells are connected in series.

In the above examples, a battery module is composed of only three cells. However, it will be apparent that a battery module can be also produced by connecting any number of cells according to the invention. In this case, if a battery module is composed of a number of cells to be connected, other insulating trays than the insulating trays 105, 106 may be employed. In essence, a pair of welding electrodes for welding together the adjacent cells may be insulated.

In the above examples, an electric current of 3 KA is passed for about 15 msec to effect the welding. However, the applied current value may be 1 KA or more to attain the same effects, irrespective of the size of battery. Also, the applied time may be 5 msec or more to attain the same effects. If a current is passed for a longer time (e.g., 1 second or more), each cell will be adversely affected, which is unpreferable. Further, the welding current power source is not limited to the direct current, but the alternating current may be used.

Further, in the above examples, the sealing member is a positive electrode terminal, and the can is a negative electrode terminal. However, the sealing member may be a negative electrode terminal, and the can may be a positive electrode terminal.

Also, the invention has been applied to the nickel-hydrogen battery. However, the invention may be applied to other batteries such as the nickel-cadmium battery, besides the nickel-hydrogen battery.

What is claimed is:

1. A battery module consisting of a plurality of cells electrically connected, each cell comprising a case serving as a terminal of one electrode and containing a cell element with a positive electrode and a negative electrode disposed to sandwich an electrolyte, and a terminal of the other electrode isolated from said case, said battery module comprising:

a connecting member having at least one projection on each of said terminal sides between adjacent two terminals of said cells, wherein said connecting member is made of a conductive material, and comprises an annular base portion having its outer diameter smaller than an inner diameter of the opening portion of said case, a convex portion with bottom protruding upward or downward alternately from said base portion, and a projection protruding from the bottom of said convex portion, wherein a contact part between the projection of said convex portion protruding upward and downward alternately and the bottom of the case of said other cell is welded;

wherein each cell comprises a sealing member having a cap via an insulator in an opening portion of a case serving as a terminal of one electrode, said cap serving as a terminal of the other electrode, and said connecting member has an aperture having a larger diameter than said cap at a position corresponding to said cap between said sealing member of one cell and the bottom of said case of the other cell, wherein a contact part between said connecting member and said terminal of said other electrode of said one cell, and a contact part between said connecting member and the case of said other cell are welded at said projections, respectively.

2. A battery module according to claim 1, wherein said connecting member is made of a conductive material, and comprises a polygonal base portion having its outer diameter smaller than an inner diameter of the opening portion of said case, and partially formed with a notch, a convex portion with bottom protruding upward or downward alternately from said base portion, and a projection projecting from the bottom of said convex portion, wherein a contact part between the projection of said convex portion projecting in one direction and the sealing member of said one cell is welded, and a contact part between the projection of said convex portion projecting in the other direction and the bottom of the case of said other cell is welded.

3. A battery module according to claim 1, wherein said connecting member is made of a conductive material, and comprises a first base plate curved or crooked along an outside periphery of the opening portion of said case, and a second base plate curved or crooked along an outside periphery of the opening portion of said case, said first base plate and said second base plate being spaced from each other with the interposition of said cap to make up an aperture in their central part, each of said first base plate and said second base plate having a convex portion with bottom protruding upward or downward alternately, and a projection projecting from the bottom of said convex portion, wherein a contact part between the projection of said convex portion projecting in one direction and the sealing member of said one cell is welded, and a contact part between the projection of said convex portion projecting in the other direction and the bottom of the case of said other cell is welded.

4. A battery module according to claim 1, wherein the thickness of a projection and the thickness of the bottom of said convex portion are made smaller than the thickness of the bottom of said case, and the thickness of said base plate is made greater than the thickness of the bottom of said case.

5. A battery module according to claim 1, wherein said connecting member has an annular insulating base plate having its outer diameter smaller than an inner diameter of the opening portion of said case, and a conductive ring integrally formed, said conductive ring being formed within said insulating base plate and jutted out vertically from said insulating base plate, in which a lower end part of said conductive ring is welded to the sealing member of said one cell, and an upper end part of said conductive ring is welded to the bottom of the case of the other cell.

6. A battery module according to claim 1, wherein said connecting member consists of a cylinder having a flange portion with conductivity, with an insulating ring disposed around an outside periphery of said cylinder, in which said flange portion is welded to the sealing member of said one cell, and an upper end part of said cylinder is welded to the bottom of the case of said other cell.

7. A battery module according to claim 1, wherein said connecting member has a cylinder formed integrally with said cap to be concentric, said cylinder having a flange portion on the bottom of said cap portion, with an insulating ring disposed around an outside periphery of said cylinder, in which a lower end part of said cylinder is welded to the sealing member of said one cell, and an upper end part of said cylinder is welded to the bottom of said case of the other cell.

8. A method for manufacturing a battery module of claim 1 including the steps of:
preparing a plurality of cells connected in series, each cell comprising a case serving as a terminal of one electrode and containing a cell element with a positive electrode and a negative electrode disposed to sandwich an electrolyte, and a terminal of the other electrode isolated from said case;
aligning the plurality of cells so that adjacent terminals are contacted via a connecting member; and
welding said adjacent terminals by passing a welding current through at least one cell element among the plurality of cells aligned in one row.

9. A method for manufacturing a battery module according to claim 1, where said connecting member has at least one projection on each of said case side and said terminal side, wherein a contact part between said connecting member and said terminal of said one cell, and a contact part between said connecting member and the case of said other cell are welded at said projection, respectively.

10. A method for manufacturing a battery module of claim 1, said method including:
aligning said plurality of cells in one row by placing a connecting member having an aperture at a position corresponding to said cap between said sealing member of one cell and the bottom of said case of the other cell, said aperture having a larger diameter than that of said cap;
pressurizing said plurality of cells aligned in one row from both ends at a predetermined pressure, and passing a welding current between a pair of welding electrodes arranged in contact with the cases of arbitrary two adjacent cells; and
welding said connecting member and said sealing member of said one cell, as well as said connecting member and the bottom of said case of the other cell respectively.

11. A battery module according to claim 1, wherein said connecting member is made of a conductive material formed by pressing a plate and has projections made of bars formed during the pressing.

12. A battery module consisting of a plurality of cells electrically connected, each cell comprising a case serving as a terminal of one electrode and containing a cell element with a positive electrode and a negative electrode disposed to sandwich an electrolyte, and a terminal of the other electrode isolated from said case, said battery module comprising:
a connecting member having at least one projection on each of said terminal sides between adjacent two terminals of said cells;
wherein said connecting member is made of a conductive material, and comprises an annular base portion having its outer diameter smaller than an inner diameter of the opening portion of said case, and partially formed with a notch, a convex portion with bottom protruding upward or downward alternately from said base portion, and a projection protruding from the bottom of said convex portion, wherein a contact part between the projection of said convex portion protruding upward and downward alternately and the bottom of the case of said other cell is welded;
wherein each cell comprises a sealing member having a cap via an insulator in an opening portion of a case serving as a terminal of one electrode, said cap serving as a terminal of the other electrode, and said connecting member has an aperture having a larger diameter than said cap at a position corresponding to said cap between said sealing member of one cell and the bottom of said case of the other cell, wherein a contact part between said connecting member and said terminal of said other electrode of said one cell, and a contact part between said connecting member and the case of said other cell are welded at said projection, respectively.

* * * * *